US012742509B2

(12) United States Patent
Wang

(10) Patent No.: US 12,742,509 B2
(45) Date of Patent: Sep. 22, 2026

(54) DUAL-USE ADAPTOR AND SPEAKER STAND HAVING THE SAME

(71) Applicant: K.H.S. Musical Instrument Co., Ltd., New Taipei City (TW)

(72) Inventor: Li-Gang Wang, Tianjin City (CN)

(73) Assignee: K.H.S. Musical Instrument Co., Ltd., New Taipei City (TW)

( * ) Notice: Subject to any disclaimer, the term of this patent is extended or adjusted under 35 U.S.C. 154(b) by 147 days.

(21) Appl. No.: 18/946,288

(22) Filed: Nov. 13, 2024

(65) Prior Publication Data

US 2025/0211882 A1 Jun. 26, 2025

(30) Foreign Application Priority Data

Dec. 25, 2023 (TW) ................................ 112150608

(51) Int. Cl.
*F16L 15/02* (2006.01)
*F16L 15/00* (2006.01)
*H04R 1/02* (2006.01)

(52) U.S. Cl.
CPC ............. *F16L 15/02* (2013.01); *F16L 15/007* (2013.01); *H04R 1/02* (2013.01)

(58) Field of Classification Search
CPC .......... F16L 15/02; F16L 15/007; H04R 1/02; H04R 1/026; A47B 81/06; A47B 81/061; A47B 81/062; A47B 81/064; A47B 96/00; A47B 96/14
See application file for complete search history.

(56) References Cited

U.S. PATENT DOCUMENTS 1,663,356 A * 3/1928 Smith ...................... A47H 1/02 403/300
2,448,232 A * 8/1948 Muse ...................... F16L 15/02 285/94
4,127,252 A * 11/1978 Splawn .................. H04R 1/026 248/333
4,671,478 A * 6/1987 Schoenig ............ F16M 11/245 248/123.2
4,836,485 A * 6/1989 Cooper .............. F16M 11/2021 248/278.1
5,833,186 A * 11/1998 Kosmoski ............ G06F 1/1605 248/221.11

(Continued)

FOREIGN PATENT DOCUMENTS

GB 2355182 A * 4/2001 ............. H04R 1/026

*Primary Examiner* — Eret C McNichols
(74) *Attorney, Agent, or Firm* — Donald E. Stout; Stout, Uxa & Buyan, LLP

(57) ABSTRACT

A dual-use adaptor includes a stationary tube, a section tube, a conversion nut, an adjusting stud, a first positioning screw, and a second positioning screw. The stationary tube includes a first end fixed to the section tube and a second end rotationally coupled to the conversion nut. The adjusting stud includes a positioning groove and is disposed within the stationary tube to threadably couple with the conversion nut. The first positioning screw extends radially from the inner wall of the stationary tube to the conversion nut. The second positioning screw extends radially from the inner wall of the stationary tube to the positioning groove. Rotation of the conversion nut causes the adjustment stud to move axially along the stationary tube.

5 Claims, 5 Drawing Sheets

(56) References Cited

U.S. PATENT DOCUMENTS

| | | | | |
|---|---|---|---|---|
| 7,498,501 | B1 * | 3/2009 | Hsieh | G10D 13/18 84/415 |
| 8,052,105 | B2 * | 11/2011 | Lippert | H04R 1/026 411/21 |
| 8,126,184 | B2 * | 2/2012 | Parker | H04R 1/026 381/387 |
| 8,229,152 | B2 * | 7/2012 | Sumitani | H04R 5/02 381/334 |
| 8,633,365 | B2 * | 1/2014 | May | H04R 1/026 84/387 A |
| 8,675,906 | B2 * | 3/2014 | Lau | H04R 1/026 381/388 |
| 9,516,400 | B1 * | 12/2016 | Roberts | F16M 11/28 |
| 11,750,957 | B2 * | 9/2023 | Kamp | H04R 1/026 381/394 |
| 11,856,347 | B1 * | 12/2023 | Roberts | F16M 11/2014 |
| 11,918,858 | B2 * | 3/2024 | Agrawal | A63B 71/0054 |
| 2002/0066837 | A1 * | 6/2002 | Dunbar | H04R 1/083 248/125.7 |
| 2006/0278470 | A1 * | 12/2006 | Carola | H04R 5/02 181/150 |
| 2013/0048802 | A1 * | 2/2013 | Guran | F16M 11/041 248/122.1 |
| 2015/0122968 | A1 * | 5/2015 | Hu | F16M 11/14 248/558 |
| 2015/0345529 | A1 * | 12/2015 | Slaton | G10D 13/02 84/421 |
| 2020/0049289 | A1 * | 2/2020 | Levy | F16L 15/007 |
| 2026/0057859 | A1 * | 2/2026 | Chiao | G10D 13/11 |

* cited by examiner

DUAL-USE ADAPTOR AND SPEAKER STAND HAVING THE SAME

CROSS-REFERENCE TO RELATED APPLICATIONS

The entire contents of Taiwan Patent Application No. 112150608, filed on Dec. 25, 2023, from which this application claims priority, are expressly incorporated herein by reference.

BACKGROUND OF THE INVENTION

1. Field of the Invention

The present invention relates to a dual-use adaptor and speaker stands having the adaptor.

2. Description of Related Art

A speaker stand is usually placed on the floor to support one or more speakers. In addition to support the loudspeaker, the speaker stand makes the sound better by eliminating resonance. The speaker stand and the speaker are usually connected through gravity or a simple mechanism. Generally, the speaker stand is designed to have a speaker attached to its one or both ends. For example, one end of the speaker stand has a pole to insert into a connection hole of the speaker and hence connecting the speaker stand and the speaker.

However, speakers of different sizes or brands have different hole sizes. A variety of speaker stands or a same speaker stand with different replaceable connecting poles is required to connect speakers with different connection holes. The existing design is inconvenient and requires carrying multiple speaker stands, which increases the burden of transportation and manpower.

SUMMARY OF THE INVENTION

This summary is provided to introduce a selection of concepts in a simplified form that are further described below in the detailed description. This summary, and the foregoing background, is not intended to identify key aspects or essential aspects of the claimed subject matter. Moreover, this summary is not intended for use as an aid in determining the scope of the claimed subject matter.

In one aspect, a dual-use adaptor is provided with a stationary tube, a section tube, a conversion nut, an adjusting stud, a first positioning screw, and a second positioning screw. The section tube is fixed to a first end of the stationary tube. The conversion nut rotationally couples with a second end of the stationary tube. The adjusting stud is disposed within the stationary tube to threadably couple with the conversion nut and comprises a positioning groove. The first positioning screw extends radially from an inner wall of the stationary tube to the conversion nut. The second positioning screw extends radially from the inner wall of the stationary tube to the positioning groove. Whereby rotation of the conversion nut causes the adjustment stud to move axially along the stationary tube, and wherein the adjusting stud is flush with the conversion nut such that the stationary tube is adapted to insert into an first hole of a first speaker, or the adjusting stud is jutted out the conversion nut such that the adjusting stud is adapted to insert into a second hole of a second speaker.

In one embodiment, the first end of the stationary tube further comprises a stationary nut that is fixed to the section tube and threadably coupled with the adjusting stud.

In one embodiment, the inner wall of the stationary tube comprises a first through-hole, the conversion nut comprises a nut portion and a rib portion with an annular groove, and the first positioning screw passes through the first through-hole and its terminal is disposed within the annular groove.

In one embodiment, the inner wall of the stationary tube comprises a second through-hole, the second positioning screw passes through the second through-hole and extends to the positioning groove, and the rotation of the conversion nut makes a first end or a second end of the positioning groove abut against the second positioning screw.

In another aspect, a speaker stand is provided with an end that comprises a dual-use adaptor as described above.

BRIEF DESCRIPTION OF THE DRAWINGS

Non-limiting and non-exhaustive embodiments of the disclosed technology, including the preferred embodiment, are described with reference to the following figures, wherein like reference numerals refer to like parts throughout the various views unless otherwise specified.

DETAILED DESCRIPTION OF THE PREFERRED EMBODIMENT

Embodiments are described more fully below with reference to the accompanying Figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense.

Figure 1:
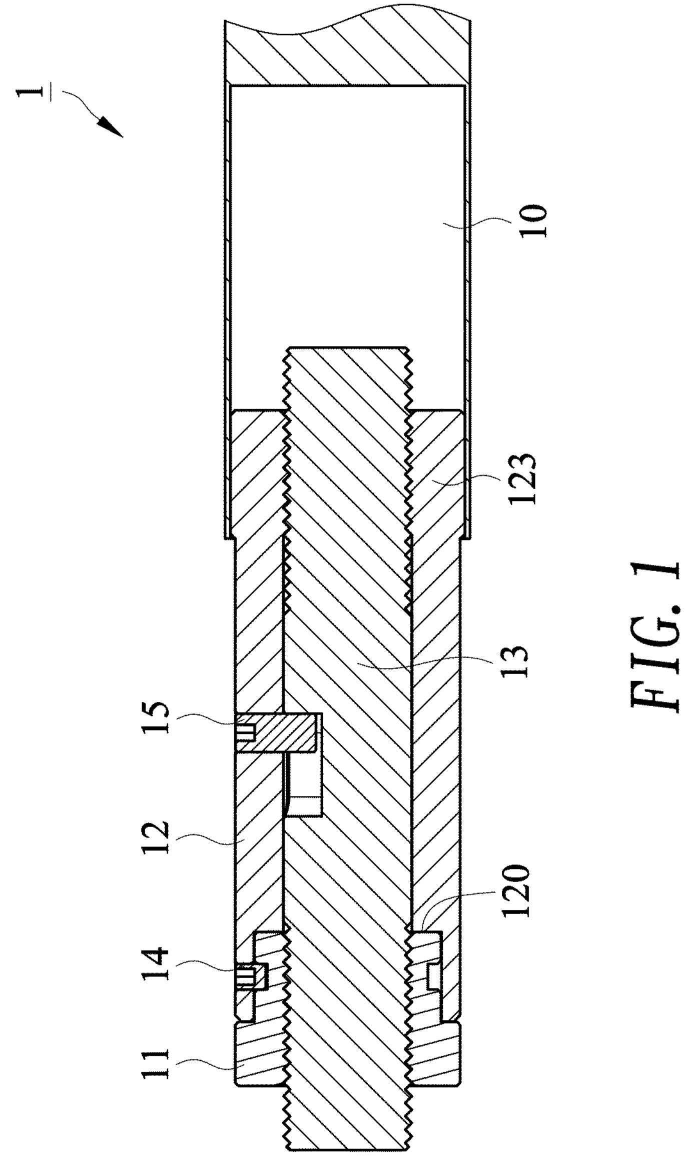
FIG. 1 is a cross-sectional view of a dual-use adaptor according to an embodiment of the present invention.
Figure 2:
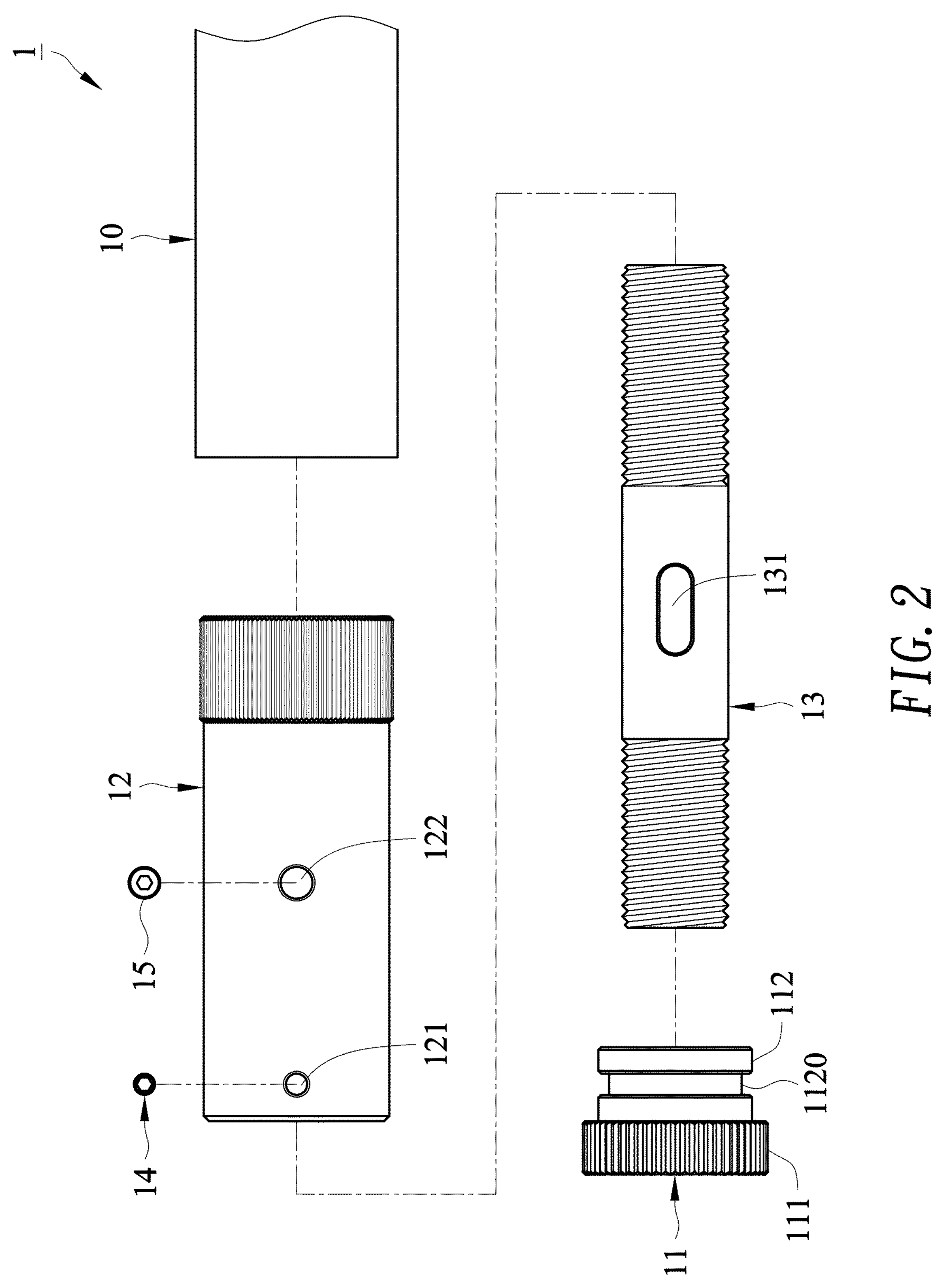
FIG. 2 is an exploded view of the dual-use adaptor according to the embodiment of the present invention.

FIGS. 1 and 2 are respectively a cross-sectional view and an exploded view of a dual-use adaptor 1 according to an embodiment of the present invention. Referring to FIGS. 1 and 2, the adaptor 1 includes a section tube 10, a conversion nut 11, a stationary tube 12, an adjusting stud 13, a first positioning screw 14, and a second positioning screw 15.

A first end of the stationary tube 12 may include a stationary nut 123, which is fixed to one end of the section tube 10. The fixing between the stationary nut 123 and the section tube 10 may comprise, but is not limited to: interference fit. The conversion nut 11 is rotationally coupled to a second end of the stationary tube 12. In the exemplary embodiment, the conversion nut 11 includes a cylindrical nut portion 111 and a rib portion 112, wherein the rib portion 112 is exactly disposed in a cylindrical recess 120 at the second end of the stationary tube 12.

Referring to FIGS. 1 and 2, a wall of the stationary tube 12 includes a first through-hole 121 and a second through-hole 122. The rib portion 112 of the conversion nut 11 has an annular groove 1120. The first positioning screw 14 passes through the first through-hole 121 and its terminal is disposed in the annular groove 1120. The first positioning screw 14 is used to block the conversion nut 11 so that it cannot move along the axial direction of the stationary tube 12. The adjusting stud 13 includes a long and narrow positioning groove 131. The second positioning screw 15 passes through the second through-hole 122 and its terminal is disposed in the positioning groove 131. The adjusting stud 13 is threadably coupled to the conversion nut 11 and the stationary nut 123. For example, in the exemplary embodiment, both ends of the adjusting stud 13 have external threads, and the conversion nut 11 and the stationary nut 123 have internal threads to thread the external threads of the adjusting stud 13. Furthermore, although the first positioning screw 14 and the second positioning screw 15 are illustrated in the form of screws, other non-screw components with similar shapes may also be used.

Figure 3:
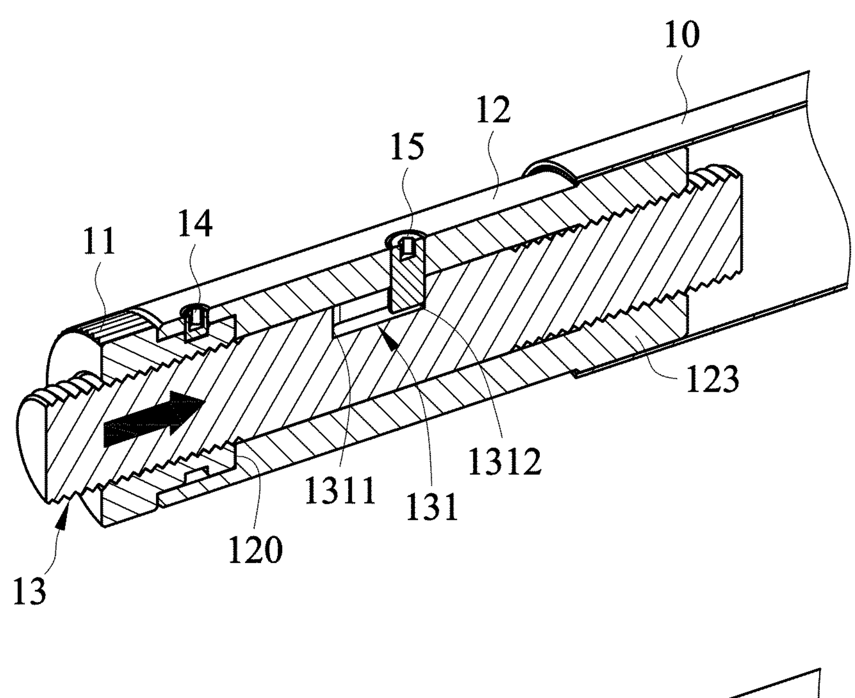
FIG. 3 shows front and cut views of the dual-use adaptor operated in a first position.
Figure 3:
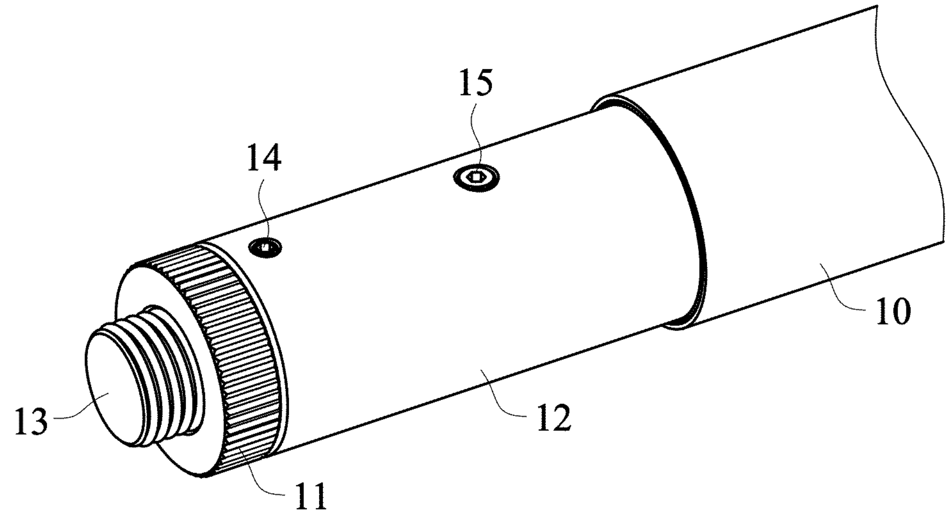
Figure 4:
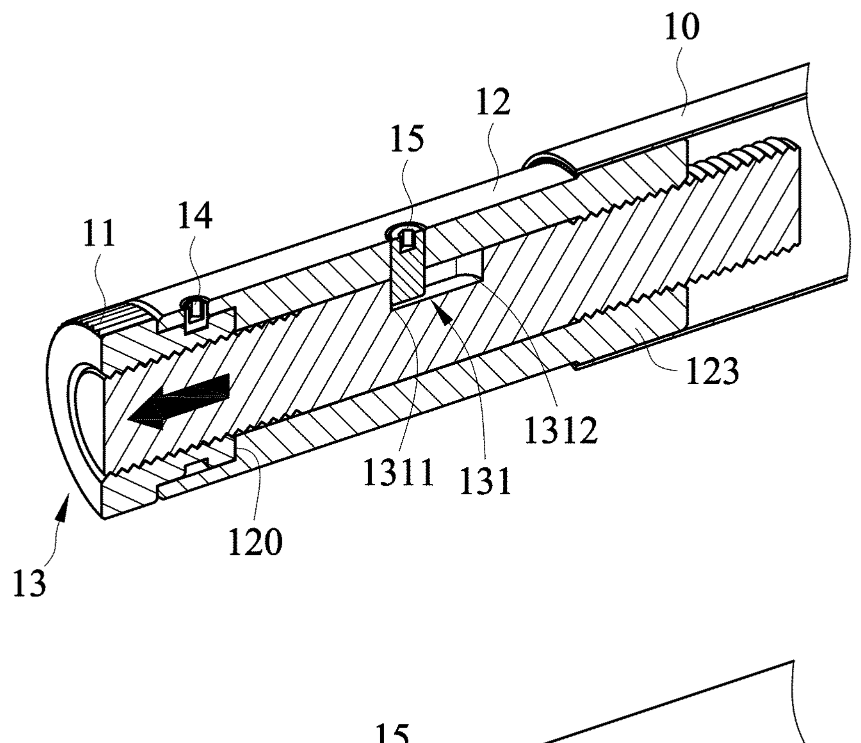
FIG. 4 shows front and cut views of the dual-use adaptor operated in a second position.
Figure 4:
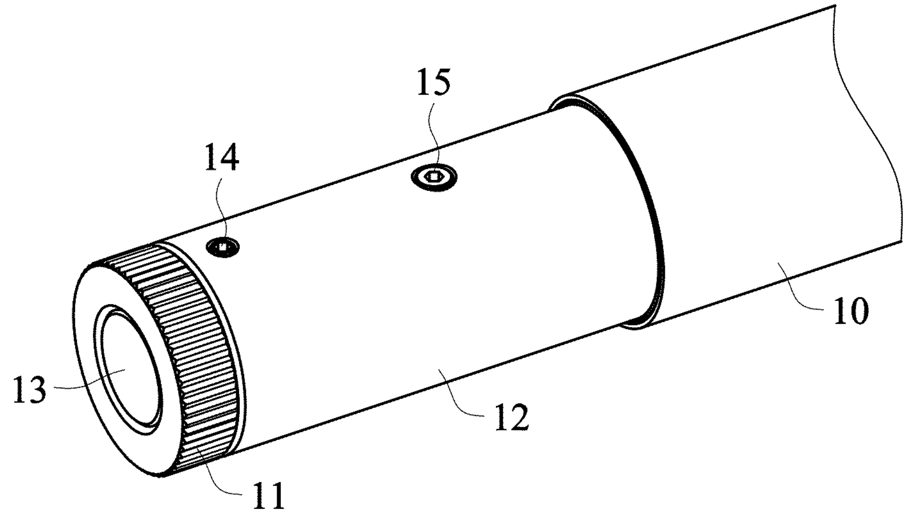

With the above design, the rotation of the conversion nut 11 causes the adjusting stud 13 to move forward or backward along the axial direction of the stationary tube 12. FIGS. 3 and 4 are schematic diagrams showing the operation of the conversion nut 11. Referring to FIG. 3, the second positioning screw 15 is against a second end 1312 of the positioning groove 131. When the user rotates the conversion nut 11 in a direction, e.g., clockwise, the adjusting stud 13 moves backward along the axial direction of the stationary tube 12 and hence part of the adjusting stud 13 sink into the stationary tube 12. As shown in FIG. 4, when the user continues to rotate the conversion nut 11 in a single direction, e.g., clockwise, more portions of the adjusting studs 13 are sunk into the stationary tube 12 until the adjusting stud 13 is flush with the surface of the conversion nut 11. At this time, the second positioning screw 15 is against a first end 1311 of the positioning groove 131, and the adjusting stud 13 cannot continue to move backward along the axial direction of the adaptor 1.

Referring to FIG. 4, the second positioning screw 15 is initially located at the first end 1311 of the positioning groove 131. When the user rotates the conversion nut 11 in a direction, e.g., counterclockwise, the adjusting stud 13 moves forward along the axial direction of the stationary tube 12 to jut out part of the adjusting stud 13. When the user continues to rotate the conversion nut 11 in a direction, e.g., counterclockwise, more portions of the adjusting stud 13 are protruded or jutted out until the positioning screw 15 abuts the second end 1312 of the positioning groove 131, as shown in FIG. 3.

As shown in FIG. 4, when the adjusting stud 13 is moved to the position that the adjusting stud 13 is flush with the conversion nut 11, the stationary tube 12 of the adaptor 1 is adapted to insert into an first hole of a first speaker (not shown). And the diameter of the first hole fits the outer diameter of the stationary tube 12.

As shown in FIG. 3, when the adjusting stud 13 is jutted out, the adjusting stud 13 of the adaptor 1 is adapted to insert into a second hole of a second speaker (not shown). And the diameter of the second hole fits the outer diameter of the adjusting stud 13.

Figure 5:
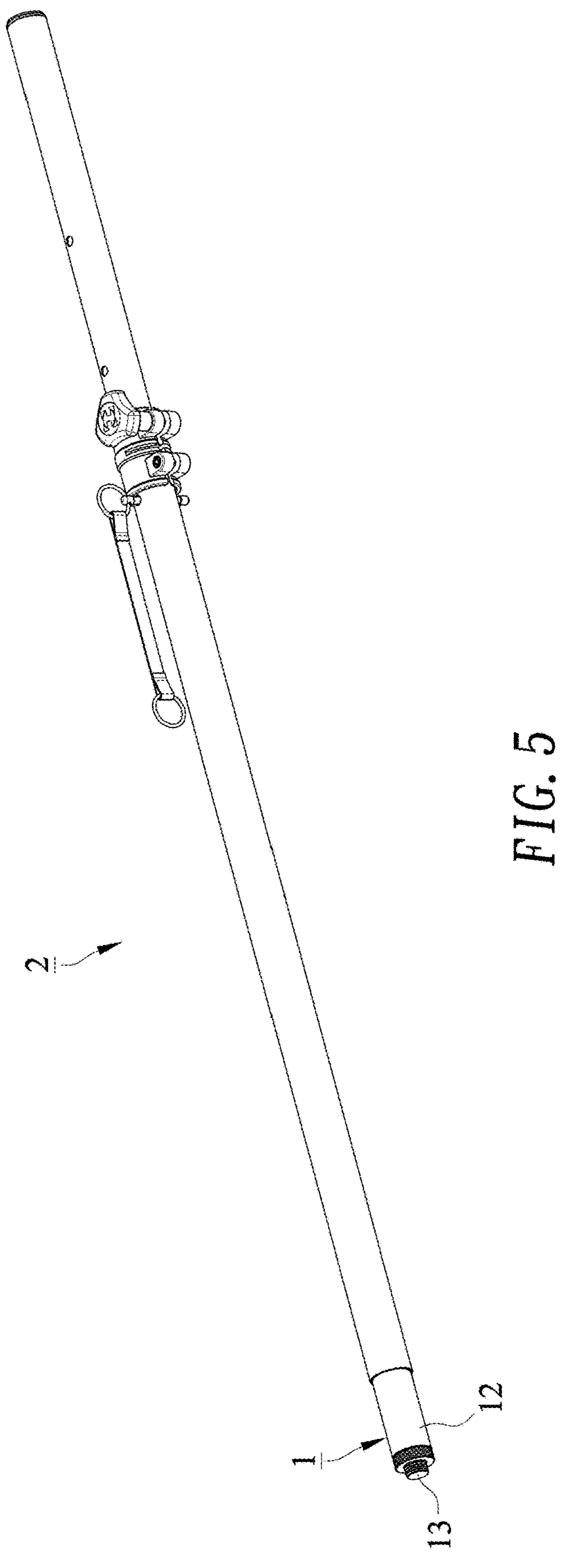
FIG. 5 shows a speaker stand according one embodiment of the present invention.

FIG. 5 shows a speaker stand 2 according to an embodiment of the present invention. At least one end of the speaker stand 2 includes the adaptor 1 as described FIGS. 1-4. In one embodiment, both ends of the speaker stand 2 have the adaptor 1 as described FIGS. 1-4. In one embodiment, the speaker stand 2 is a three-legged stand (tripod) and the top of which includes the adaptor 1 as described FIGS. 1-4.

From the foregoing, it will be appreciated that specific embodiments of the invention have been described herein for purposes of illustration, but that various modifications may be made without deviating from the scope of the invention. Accordingly, the invention is not limited except as by the appended claims.

Although the technology has been described in language that is specific to certain structures and materials, it is to be understood that the invention defined in the appended claims is not necessarily limited to the specific structures and materials described. Rather, the specific aspects are described as forms of implementing the claimed invention. Because many embodiments of the invention can be practiced without departing from the spirit and scope of the invention, the invention resides in the claims hereinafter appended.

What is claimed is:

1. A dual-use adaptor, comprising:
- a stationary tube;
- a section tube fixed to a first end of the stationary tube;
- a conversion nut rotationally connected to a second end of the stationary tube;
- an adjusting stud being disposed within the stationary tube to threadably couple with the conversion nut and comprising a positioning groove;
- a first positioning screw extending radially from an inner wall of the stationary tube to the conversion nut; and
- a second positioning screw extending radially from the inner wall of the stationary tube to the positioning groove;
- whereby rotation of the conversion nut causes the adjustment stud to move axially along the stationary tube, and wherein the adjusting stud is flush with the conversion nut such that the stationary tube is adapted to insert into an first hole of a first speaker, or the adjusting stud is jutted out the conversion nut such that the adjusting stud is adapted to insert into a second hole of a second speaker.

2. The dual-use adaptor according to claim 1, wherein the first end of the stationary tube further comprises a stationary nut that is fixed to the section tube and threadably coupled with the adjusting stud.

3. The dual-use adaptor according to claim 1, wherein the inner wall of the stationary tube comprises a first through-hole, the conversion nut comprises a nut portion and a rib portion with an annular groove, and the first positioning screw passes through the first through-hole and its terminal is disposed within the annular groove.

4. The dual-use adaptor according to claim 1, wherein the inner wall of the stationary tube comprises a second through-hole, the second positioning screw passes through the second through-hole and extends to the positioning groove, and the rotation of the conversion nut causes a first end or a second end of the positioning groove to abut against the second positioning screw.

5. A speaker stand having an end that comprises a dual-use adaptor, which comprising:
- a stationary tube;
- a section tube fixed to a first end of the stationary tube;
- a conversion nut rotationally connected to a second end of the stationary tube;
- an adjusting stud being disposed within the stationary tube to threadably couple with the conversion nut and comprising a positioning groove;
- a first positioning screw extending radially from an inner wall of the stationary tube to the conversion nut; and a second positioning screw extending radially from the inner wall of the stationary tube to the positioning groove;

whereby rotation of the conversion nut causes the adjustment stud to move axially along the stationary tube, and wherein the adjusting stud is flush with the conversion nut such that the stationary tube is adapted to insert into an first hole of a first speaker, or the adjusting stud is jutted out the conversion nut such that the adjusting stud is adapted to insert into a second hole of a second speaker.

* * * * *